United States Patent [19]

Banevicius et al.

[11] Patent Number: 4,994,217
[45] Date of Patent: Feb. 19, 1991

[54] LOW ODOR POLYPHENYLENE ETHER/POLYSTYRENE PROCESS

[75] Inventors: John P. Banevicius, Slingerlands, N.Y.; William M. Bunting, New Haven, Conn.; Alexandros Hasson, Delmar, N.Y.; Susan J. Hathaway, Albany, N.Y.; William E. Pecak, Cohoes, N.Y.; John P. Skilbeck, Delmar, N.Y.

[73] Assignee: General Electric Company, Selkirk, N.Y.

[21] Appl. No.: 291,563

[22] Filed: Dec. 29, 1988

[51] Int. Cl.$^5$ ............................................ B29C 49/76
[52] U.S. Cl. .................................. 264/45.9; 159/2.2; 264/51; 264/101; 264/143; 264/211.23; 264/321; 264/349
[58] Field of Search ............... 264/51, 53, 321, 45.9, 264/46.1, 349, 101, 102, 331.11, 143, 211.23; 425/203-204, 208, 209; 159/2.2

[56] References Cited

U.S. PATENT DOCUMENTS

| | | |
|---|---|---|
| 3,306,874 | 2/1967 | Hay .......................... 260/47 |
| 3,306,875 | 2/1967 | Hay .......................... 260/47 |
| 3,451,462 | 6/1969 | Szabo et al. ............... 425/4 C |
| 3,633,880 | 1/1972 | Newmark .................. 259/191 |
| 3,668,161 | 6/1972 | Nauman et al. ........... 264/53 |
| 3,781,132 | 12/1973 | Latinen ...................... 264/349 |
| 3,917,507 | 11/1975 | Skidmore .................. 425/204 |
| 4,360,486 | 11/1982 | DiBiasi et al. ............. 264/53 |
| 4,369,278 | 1/1983 | Kasahara et al. ......... 524/147 |
| 4,504,338 | 3/1985 | Ives ............................. 264/53 |
| 4,705,811 | 11/1987 | Park ............................ 264/53 |
| 4,727,093 | 2/1988 | Allen et al. ................. 264/53 |
| 4,746,482 | 5/1988 | Ribbing et al. ............ 264/171 |

FOREIGN PATENT DOCUMENTS 0226204 5/1987 European Pat. Off.

Primary Examiner—Jeffery Thurlow
Attorney, Agent, or Firm—Hedman, Gibson, Costigan & Hoare

[57] ABSTRACT

Low odor polyphenylene ether/polystyrene resins are produced in a process by solution blending low odor polyphenylene ether and polystyrene resins and passing the solution through devolatilizers prior to recovery.

22 Claims, 4 Drawing Sheets

LOW ODOR POLYPHENYLENE ETHER/POLYSTYRENE PROCESS

This invention relates to the production of low odor polyphenylene ether/polystyrene materials by a process comprising solution blending of the resins and passing the solution through a devolatilization zone or zones to reduce the content of odoriferous impurities in the product.

BACKGROUND OF THE INVENTION

Polyphenylene ethers (also known as polyphenylene oxides) are a class of polymers widely used in industry, especially as engineering plastics in applications requiring toughness and heat resistance. For many such applications, the polyphenylene ethers are blended with various kinds of polystyrenes to improve their processability.

In recent years, it has become increasingly desirable to use polyphenylene ether/polystyrene resins in the form of sheets, molded or extruded articles and foamed sheets for food packaging as well as other applications. In food packaging applications, it is essential that the polyphenylene ether/polystyrene resin be substantially free from materials which are volatile, have undesirable odors or would otherwise harm the food. Various materials of this kind are known to be present in polyphenylene ether/polystyrene resins. They include odoriferous amines, particularly dialkylamines such as di-n-butylamine, which are components of the catalyst used in the preparation of polyphenylene ethers, and amines resulting from thermal cracking of polyphenylene ether-amine adducts. Also present may be by-products formed in the synthesis of the substituted phenols from which polyphenylene ethers are prepared. In the case of poly(2,6-dimethyl-1,4-phenylene ether) these frequently include 7-methyldihydrobenzofuran; 2,4,6-trimethylanisole (which is an especially powerful contributor to odor); 2,3-dihydrobenzofuran; 2,6-dimethylcyclohexanone and 2-ethylhex-2-enal. Styrene monomer is also a contributor to odor, as are toluene, ethyl benzene and other normally liquid aromatic hydrocarbon solvents.

Previous attempts to remove volatile compounds, including odoriferous species, from polyphenylene ether and/or polystyrene resins have been reported. However, none of them suggest unique suitability for making low odor polyphenylene ether/polystyrene pellets, solid sheets, molded or extruded articles and foamed materials. Aneja and Skilbeck, in commonly assigned EPO Patent Application No. 0226204, describe a method and apparatus for devolatilizing polymer solutions, including polyphenylene ether resins and polystyrene resins, in combination. The devolatilized polymer blend issues from the heat exchanger as a melt solution. Allen, Bacskai, Roberts and Bopp, in commonly assigned U.S. patent application Ser. No. 67,556, filed June 26, 1986, describe making low density high compressive strength foams from engineering polymer resins, e.g., polyphenylene ether resins and polystyrene resins, by feeding them to at least one extruder, adding a blowing agent and foaming the mixture through a die. The products of this process also do not exhibit a low odor because of the presence of volatile odoriferous species. Kasahara et al., U.S. Pat. No. 4,369,278, devolatilizes mixtures of polyphenylene ethers and rubber modified polystyrenes in a vacuum vented extruder with optional introduction of steam, but the content of volatile odoriferous substances, especially trimethylanisole, is not reduced sufficiently to meet the requirements for low odor foams for food packaging. Hasson and Pecak, in commonly assigned copending U.S. patent application, Ser. No. 07/291,534, filed Dec. 29, 1988, use a multi-stage extrusion process to devolatilize blends of polyphenylene ether resin and polystyrene resin using a solvent and a vacuum in each stage. However, although the source of odoriferous amine content is substantially reduced, further reduction is possible and other compounds such as 2,4,6-trimethylanisole remain, albeit at a greatly reduced level. Banevicius, in commonly assigned copending patent application Ser. No. 07/291,562, filed Dec. 29, 1988, now allowed describes a method to prepare solutions of polyphenylene ether in normally liquid aromatic hydrocarbons, such as toluene, having the trimethylanisole content reduced by use of clean reaction solvent or by use of distillation of the recycled reaction solvent to such low levels that they do not contribute odor to the ultimate compositions; however, the products still contain a substantial content of a source of volatile odoriferous amines.

In the present state of the art, therefore, a need still exists to provide low odor pellets, foamed sheets and boards, solid sheets, molded or extruded articles and the like comprising polyphenylene ether and polystyrene resins, preferably those having sufficient melt strength and thermal stability to make them microwavable and suitable for use in contact with food. Such a need is met by the process and articles of the present invention. Briefly, the process comprises blending a solution of polyphenylene ether resin having a low trimethylanisole content with a solution of styrene resin, devolatilizing the mixed solutions first in one or more heat exchange zones, then in a stripping zone, optionally with steam present, and then recovering the low odor resin in particulate form.

SUMMARY OF THE INVENTION

Figure 1:
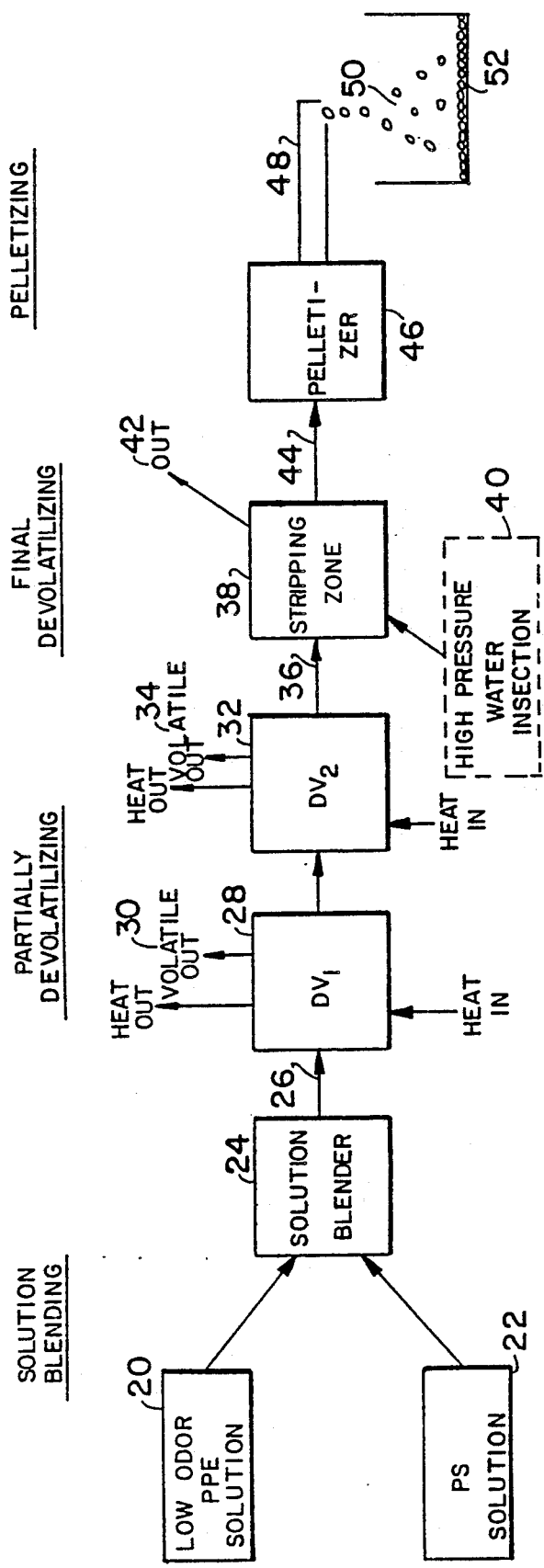
FIG. 1 illustrates, in flow chart form, a process sequence suitable for preparing pellets from resin solutions in accordance with this invention.
Figure 2:
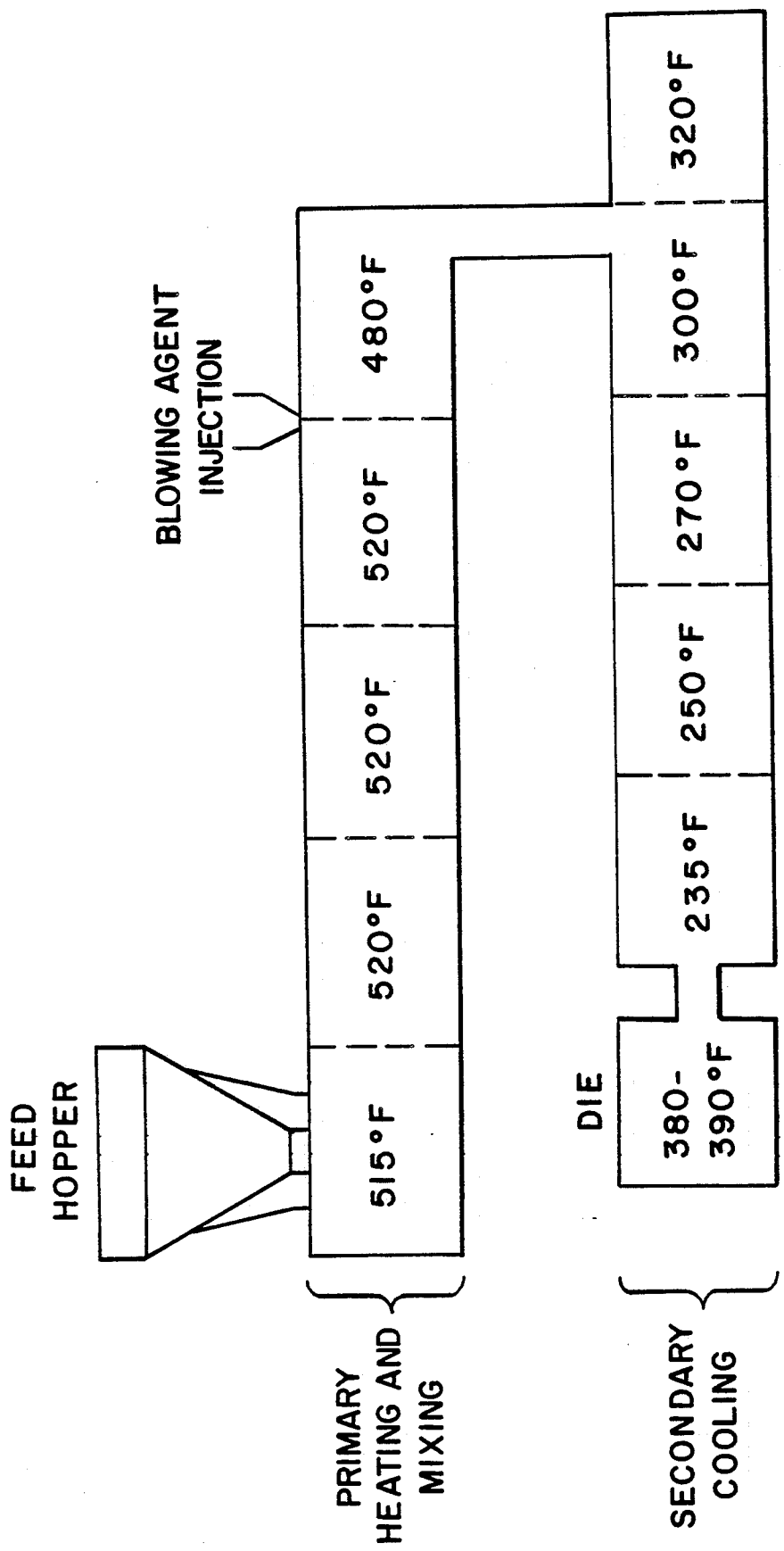
FIG. 2 illustrates a process sequence suitable to prepare foamed sheets from particulate resin compositions in accordance with this invention.

According to the present invention there is provided a process for the production of a polyphenylene ether/polystyrene resin composition of low odor, the process comprising
(i) blending
  (a) a solution comprising polyphenylene ether resin and a normally liquid aromatic hydrocarbon solvent, said solution having a by-product 2,4,6-trimethylanisole content of less than 1000 parts per million by weight based on said resin, and sources of odoriferous amine content and (b) a solution comprising a polystyrene resin or a rubber modified polystyrene resin and a normally liquid aromatic hydrocarbon solvent;

(ii) partially devolatilizing said blended solutions (a) and (b) by passing them through at least one zone of heat exchange whereby at least 25 percent of the volatiles are evaporated and separated;

(iii) feeding the partially devolatilized blended resin composition to at least one stripping zone optionally in the presence of steam or water, to complete the devolatilization thereof, and to reduce the odoriferous amine content; and optionally (iv) recovering the resin from step (iii) in particulate form.

Illustratively, the source of odoriferous amine content in step (i)(a) is greater than about 10,000 parts per million based on said resin and the source of odoriferous amine content in step (iii) is reduced to less than about 2400 parts per million based on polyphenylene ether resin content.

Preferably the polyphenylene ether resin component comprises poly(2,6-dimethyl-1,4-phenylene ether), or poly(2,6-dimethyl-co-2,3,6-trimethyl-1,4-phenylene ether) or a mixture thereof and the polystyrene resin component comprises either a polystyrene homopolymer or a rubber modified polystyrene.

The preferred normally liquid aromatic hydrocarbon solvent comprises toluene and the preferred polymer composition comprises from about 5 to about 95 parts by weight polyphenylene ether resin and from about 95 to about 5 parts by weight polystyrene resin based on the weight of the combined resins.

It is also preferable that two indirect heat exchangers, in series, be used to carry out the partial devolatilization in step (ii) and that they be set at temperatures ranging from about 150° C. to about 350° C.

Preferably, the stripping zone devolatilizing extruder employs steam or water in an amount ranging from about 1 to about 15 weight percent based on the weight of the blended resin composition. Especially preferred is employing about 2 weight percent of steam or water.

Preferably, step (iv) comprises pelletizing or dicing the blended resin composition in any conventional apparatus into pellet- or dice- shaped articles having very low odor in human organoleptic tests. It is further contemplated by the present invention to combine the particulate resin with a let-down resin such as a polyphenylene ether resin, a polystyrene resin, a rubber modified polystyrene resin or a combination of any of the foregoing and then subjecting the combination to at least one shaping operation. These shaping operations may include extruding through a die, molding or foam processing in order to obtain a variety of shaped articles.

Also contemplated by the present invention is a process including the steps of (A) feeding the particulate resin from step (iv) into at least one extruder and mixing it with a blowing agent; and (B) foaming the mixture through a die to form a shapable, foamed sheet having very low odor in human organoleptic tests.

Where foaming is desirable, typical blowing agents are selected from hydrocarbons, chlorofluorocarbons, hydrochlorofluorocarbons and mixtures thereof. A suitable blowing agent need only be soluble at melt temperatures and pressures but insoluble at ambient pressure and die temperatures.

The preferred foam extrusion apparatus of steps (A) and (B) comprises tandem single or twin screw extruders, the first extruder being adapted to mix and melt the resin and the blowing agent. Nucleating agents, flame retardants and other desired additives may also be introduced into the first extruder. The second extruder is adapted to cool the melt and is fitted with a die through which the foamable composition exits.

Also contemplated are microwavable low odor foamed articles, made by thermoforming the sheets produced by the process of this invention; and microwavable sheets, and molded or extruded articles.

DETAILED DESCRIPTION OF THE INVENTION

The polyphenylene ether (PPE) resin is normally a homopolymer or copolymer having units of the formula

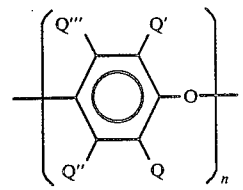

wherein $Q$, $Q'$, $Q''$, $Q'''$ are independently selected from the group consisting of hydrogen, halogen, hydrocarbon, halohydrocarbon, hydrocarbonoxy and halohydrocarbonoxy; and n represents the total number of monomer units and is an integer of at least about 20, and more usually at least 50.

The polyphenylene ether resin can be prepared in accordance with known procedures, such as those described in Hay, U.S. Pat. No. 3,306,874 and Stamatoff, U.S. Pat. No. 3,306,875 from the reaction of phenols including but not limited to 2,6-dimethylphenol; 2,6-diethylphenol; 2,6-dibutylphenol; 2,6-diauryphenol; 2,6-dipropylphenyl; 2,6-diphenylphenol; 2,6-methyl-6-tolylphenol; 2,3,5,6-tetramethylphenol and 2,6-diethyoxyphenol.

Each of these may be reacted alone to produce the corresponding homopolymer, or in pairs, or with still other phenols to produce the corresponding copolymer.

Examples of the homopolymers include
poly(2,6-dimethyl-1,4-phenylene ether),
poly(2,6-diethyl-1,4-phenylene ether),
poly(2,6-dibutyl-1,4-phenylene ether),
poly(2,6-diaury-1,4-phenylene ether),
poly(2,6-dipropyl-1,4-phenylene ether),
poly(2,6-diphenyl-1,4-phenylene ether),
poly(2,6-methyl-6-tolyl-1,4-phenylene ether),
poly(2,6-methyl-6-methoxy-1,4-phenylene ether),
poly(2,6-methyl-6-butyl-1,4-phenylene ether),
poly(2,6-dimethoxy-1,4-phenylene ether),
poly(2,3,6-trimethyl-1,4-phenylene ether),
poly(2,3,5,6-tetramethyl-1,4-phenylene ether), and
poly(2,6-diethyoxy-1,4-phenylene ether).

Examples of the copolymer include especially those of 2,6-dimethylphenol with other phenols, such as poly(2,6-dimethyl-co-2,3,6-trimethyl-1,4-phenylene ether) and poly(2,6-dimethyl-co-2-methyl-6-butyl-1,4-phenylene ether).

For purposes of the present invention, an especially preferred family of polyphenylene ethers includes those having alkyl substitution in the two positions ortho to the oxygen ether atom, i.e., those of the above formula where Q and Q' are alkyl, most preferably having from 1 to 4 carbon atoms. Illustrative members of the class are:
poly(2,6-dimethyl-1,4-phenylene)ether;
poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether;
poly(2-ethyl-6-propyl-1,4-phenylene)ether; and the like.

The most preferred polyphenylene ether resin for the purposes of this invention is low odor poly(2,6-dimethyl-1,4-phenylene ether). The low odor resin can be prepared in accordance with Banevicius, U.S. patent application Ser. No. 07/291,562, filed Dec. 29, 1988, now allowed wherein the resin is prepared in a toluene solvent, substantially free from odoriferous phenolic impurities and by-products of the monomer synthesis such as 2,4,6-trimethylanisole, 7-methyldihydrobenzofuran and the like.

The term polystyrene (PS) resin in its broadest sense is to be understood to mean at least one alkenyl aromatic polymer. The term "alkenyl aromatic polymer" as it is employed in this disclosure is intended to encompass homopolymers as well as copolymers and terpolymers of alkenyl aromatic compounds with one or more other materials. Preferably, the alkenyl aromatic polymer is based at least in part on units of the formula

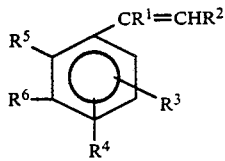

wherein $R^1$ and $R^2$ are selected from lower alkyl or alkenyl groups of from 1 to 6 carbon atoms and hydrogen; $R^3$ and $R^4$ are selected from chloro, bromo, hydrogen, and lower alkyl of from 1 to 6 carbon atoms; $R^5$ and $R^6$ are selected from hydrogen and lower alkyl and alkenyl groups of from 1 to 6 carbon atoms; or $R^5$ or $R^6$ may be concatenated together with hydrocarbyl groups to form a naphthyl group.

The above will encompass styrene, as well as homologs and analogs of styrene. Specific examples include, in addition to styrene, chlorostyrene, bromostyrene, alpha-methyl styrene, para-methyl styrene, vinyl styrene, divinylbenzene and vinyl naphthalene. Crystal polystyrene is especially preferred.

Also contemplated for use in the present invention are rubber modified polystryenes, such as rubber modified high impact polystyrenes which are generally known as HIPS. In general, these modified polystyrene resins are made by adding rubber or rubber precursors such as dienes, polydienes, olefin rubbers, acrylonitrile rubbers, acrylic rubbers and the like, during or after polymerization of the styrene, to yield an interpolymer of rubber and polystyrene, a physical admixture of rubber and polystyrene, or both, depending on the particular process employed.

Suitable rubber modifiers include polybutadiene, polyisoprene, polychloroprene, ethylene-propylene copolymers (EPR), ethylene-propylene-diene (EPD) rubbers, styrene-butadiene copolymers (SBR), polyacrylates, polynitriles, mixtures thereof and the like. The amount of rubber employed will vary, depending on such factors as the process of manufacture and individual requirements.

Included within this family of materials for purposes of this invention are more recently developed forms in which such factors as the rubber particle size, the gel and cis contents of the rubber phase, and the rubber volume percent are controlled or regulated to achieve improvements in impact resistance and other properties. These kind of HIPS are described in the patent literature including Katchman and Lee, U.S. Pat. No. 4,528,327.

Also contemplated as suitable for use are rubber modified PS and HIPS having morphological forms which are sometimes referred to as core-shell, comprising particles of rubber encapsulated polystyrene dispersed in a matrix of polystyrene resin. Examples of this type are disclosed in Bennett and Lee, U.S. Pat. No. 4,513,120 as well as the above-mentioned U.S. Pat. No. 4,528,327.

Polyphenylene ether (PPE) resins and polystyrene (PS) resins are combinable in all proportions, e.g., from about 1 to about 99 parts by weight polyphenylene ether and from about 99 to about 1 parts by weight polystyrene. It is contemplated, however, that low density compositions of the present invention are comprised of at least 2 weight percent PPE (based upon the weight of PPE and PS taken together). Compositions containing less than 2 weight percent PPE are considered to be primarily polystyrene compositions and do not generally exhibit the preferred property improvements associated with PPE/PS blends. It is well known that the addition of PPE to polystyrene resins offers improvements in impact strength, flammability ratings, tensile strength and other mechanical properties. Conversely, polystyrene is typically blended with polyphenylene ether resins to offer better processability for many thermoplastic processes.

Typical PPE/PS blends useful in the practice of the present invention will be comprised of between 5 to 95 percent and preferably 20 to 80 percent by weight PPE and 95 to 5 percent and preferably 80 to 20 percent by weight PS based upon the weight of the two resins taken together.

As the first step of the process, solutions of the two resins are prepared for blending. Each resin is dissolved or formed in situ in a normally liquid aromatic hydrocarbon having from about 6 to about 30 carbon atoms and including, for example, benzene, ethyl benzene, toluene, the three xylenes, mesitylene, styrene monomer, vinyl toluene, mixtures of any of them and the like. Usually the polyphenylene ether will be dissolved in toluene and the styrene resin will be dissolved in styrene monomer, ethylbenzene, toluene, or the like. Preferably the trimethylanisole content of the polyphenylene ether solution will be reduced below the 1000 parts per million level, based on resin, by using clean or distilled recycled hydrocarbon, e.g., toluene, as a solvent for its preparation. The polymer solutions will typically contain at least about 25 percent by weight of the polymers. Usually they will contain over 30 weight percent of polymer with from about 30 to 40 percent being most common.

The mixed resin solutions will be blended until homogeneous in any suitable mixer.

The mixed homogeneous solution will then be fed into a heat exchange zone or zones, preferably indirect, for devolatilization.

Figure 3:
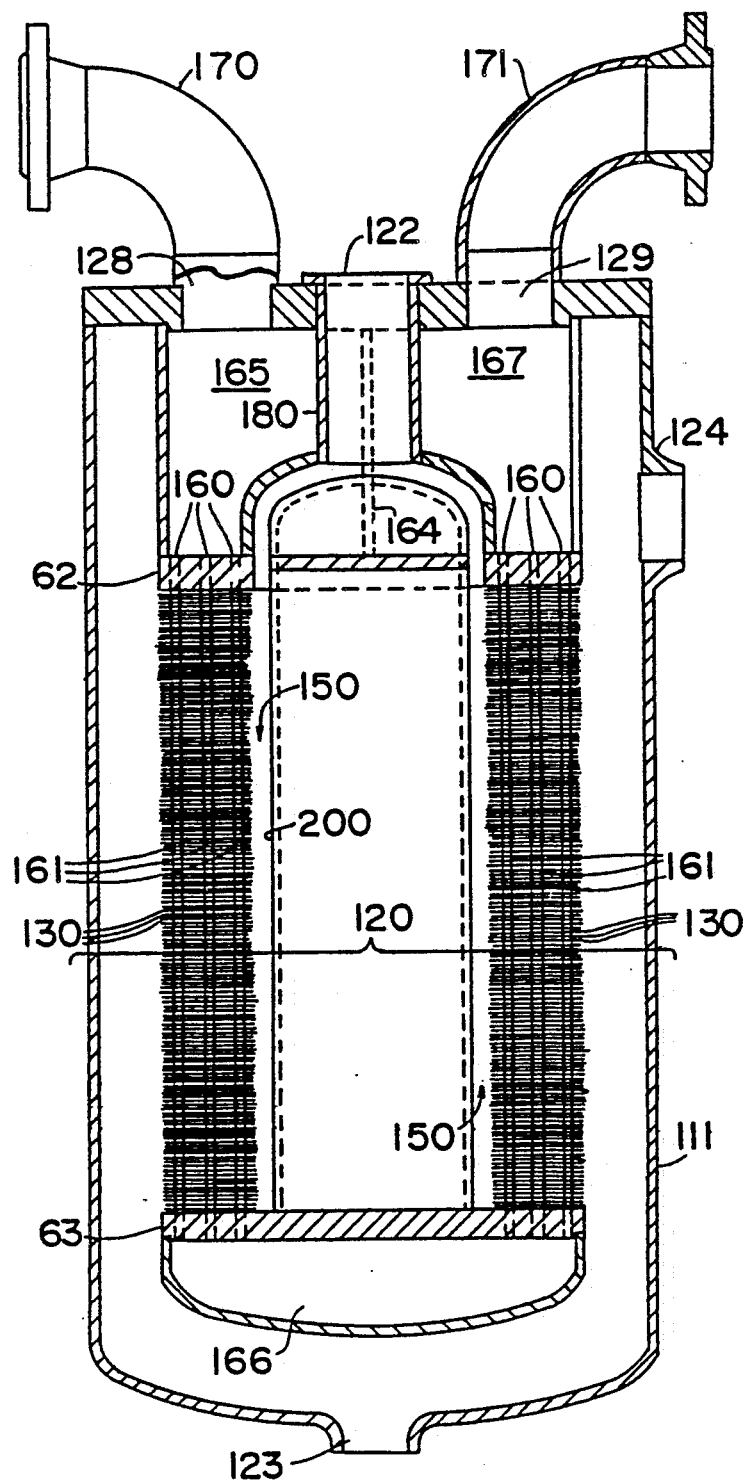
FIG. 3 illustrates a side view cross section of an apparatus suitable for devolatilization by indirect heat exchange.

Any of a number of well known devices can be employed in carrying out the heat exchange. For example, a falling strand evaportor, an agitated thin film evaporator, or a devolatilizing extruder can be used. As will be mentioned, it is preferable to use a low pressure drop thin film heat exchanger, such as shown in FIG. 3, preferably two of them in series.

In the indirect heat exchange zone, heat is provided to the polymer solution through a transferring medium. The heat source is typically a high temperature liquid which heats the transferring medium. The transferring medium comprises a solid substance, most often a metal, such as stainless steel. One possible method of avoiding polymer degradation during heating, although other methods known to those skilled in the art may be employed, is by using a short residence time, e.g., 0.05 to 10 minutes, preferably 5 to 50 seconds. The short residence time is obtained by utilizing a short zone of indirect heat exchange wherein the heating takes place rapidly and efficiently. This rapid and efficient heating is accomplished by using hot oil and an indirect heat exchange zone comprising a plurality of channels. Rapid heating is enhanced by use of oil at temperatures 20° C. to 100° C. higher than the polymer solution resulting in a large temperature gradient across the transferring medium facilitating heat transfer. Efficiency is improved by the large surface to volume ratio provided by the plurality of thin channels by which the polymer solution flows through the transferring medium. Efficiency is further increased by applying pressure to the polymer solution within the indirect heat exchange zone to prevent volatile vaporization during heating. Once the heated polymer solution exits the zone of indirect heat exchange, a large portion of volatile components are evaporated by reducing the pressure below the volatiles saturation pressure. Separation of the volatiles occurs within a vaporization chamber, wherein the volatiles in gaseous form are removed from the top and the polymer solution in liquid form is recovered from the chamber bottom. Optionally, but preferably, a second zone of indirect heat exchange is used to further remove volatiles from the partially devolatilized solution. An apparatus admirably suited for this purpose is disclosed in Aneja and Skilbeck, E.P. No. 0226204 and is shown in FIG. 3 herein by a cross-sectional view. As has been mentioned, two or more zones of indirect heat exchange can be used in series. Polymer volatile content can readily be reduced to less than 0.5 percent by weight.

As has been mentioned, polyphenylene ethers may comprise molecules having amino-alkyl end groups and these can decompose to produce odoriferous amine species. While not intending to be bound by any theory, it is believed that during heating of the polymer solution in the zone of indirect heat exchange at elevated temperatures amine removal is facilitated.

Figure 4:
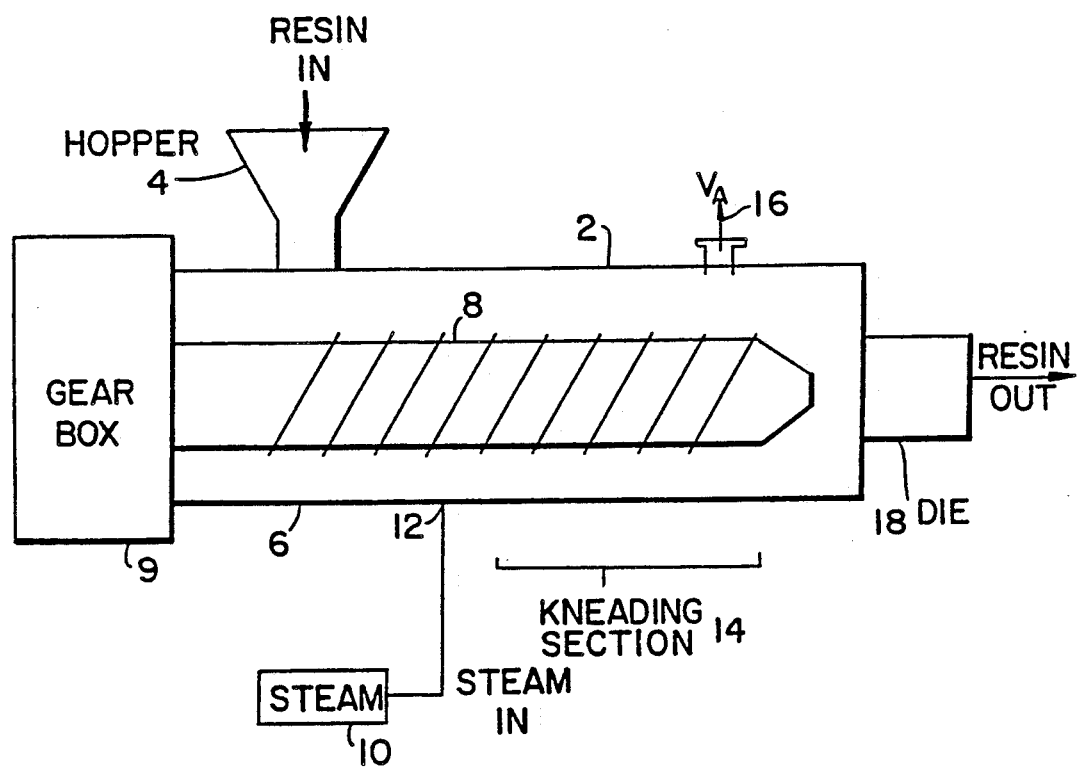
FIG. 4 illustrates a side view cross section of an apparatus suitable for stripping partially devolatilized resin blends in accordance with this invention.

The partially devolatilized polymer resin solution is then fed into a suitable apparatus for further devolatilization and steam stripping. Conveniently, this will comprise a screw extruder, as shown schematically in FIG. 4. Referring to FIG. 4, the partially devolatilized polymer solution is fed into screw extruder 2 through hopper 4. The resin is transported down barrel 6 by screw 8 driven by a motor (not shown) through gear box 9. Water or steam from boiler 10 is injected into barrel 6 through port 12 and steam is thoroughly kneaded with resin in kneading section 14. The steam and volatiles are allowed to escape downstream through vent 16 and the resin exits barrel 6 at die 18. In this apparatus the source of volatile odoriferous amine content is further reduced, preferably to less than about 2400 parts per million by weight based on polyphenylene ether resin content. Polymer volatile content in this step can readily be reduced to less than about 0.1 percent by weight.

The resin composition is then optionally recovered in particulate form. The composition is then ready for any desired shaping process, such as extruding through a die, injection molding, pelletizing, foam processing, compression molding or any other conventional primary or secondary processing operations.

Pelletizing and dicing are useful operations to reduce the composition into a more usable form. Diced plastics are generally cubed shaped while pelletized material may vary in shape from cylinders to spheres. Pellets and cubes are easily stored and provide an excellent feedstock form for loading into hoppers for injection molding and extrusion machines. Any conventional pelletizers or dicers, cold or hot state, are suitable for the practice of the present invention. See Modern Plastics Encyclopedia/88, McGraw Hill, 1987, pp 340–342.

Also contemplated by the present invention is combining the particulate material with let-down resins, including polyphenylene ether resins, prior to further processing or shaping. Resins such as a polystyrene, a rubber modified polystyrene, copolymers of styrene and acrylonitrile, poly(butylene terephthalate), poly(bisphenol-A carbonate), poly(etherimide ester), poly(ester carbonates), polyamide resins, ABS-resins, and the like, or a mixture of any of them can be used as let-down resins.

Optionally, the particulate resin composition may be directly fed into an apparatus suitable for extruding sheets or boards including foamed sheets or boards. See for example, Modern Plastics Encyclopedia/88, McGraw Hill, Oct. 1987, pp. 238–246. Especially suitable for the practice of the present invention are tandem extruders. The resin is fed into a first mixing-melting single or twin screw type extruder and melted and mixed therein with a liquid blowing agent at sufficient temperature and shear to provide an intimate blend.

During the blending step it is contemplated also to introduce conventional additives into the polymer composition melt. These include nucleating agents, flame retardants, stabilizers for thermal and color stability, antioxidants, processing aids and plasticizers, reinforcing and extending fillers, pigments and the like. Each of these may be utilized to a greater or lesser degree depending on the required final properties of the foam product. Conventional surfactants and nucleants may also be utilized, such as zinc or tin stearates, maleates, fumarates and the like.

Suitable nucleating agents, which determine the size of the foam cell and the number of foam cells, are usually a fine powder such as talc or a combination of citric acid and bicarbonate of soda.

Suitable blowing agents to be used in the melt produced in the extruder include conventional hydrocarbons, chlorofluorocarbons or hydrochlorofluorocarbons. Hydrocarbon blowing agents will include aliphatic hydrocarbons, especially those having 4 to 7 carbon atoms, such as pentane, isopentane, pentene, hexane, heptane, butane and the like. Chlorofluorocarbon blowing agents include $CCl_3F$, $CCl_2F_2$, $C_2Cl_3F_3$, $C_2ClF_5$, $CHClF_2$ and $CCl_2F_2$—$CClF_2$. These are commercially available as Freon® 11, Freon® 12, Freon® 22, Freon® 113, Freon® 115 and Freon® 114. Hydrochlorofluorocarbons blowing agents include chlorodifluoromethane, dichlorofluoromethane and the like.

Although the extrudate can be foamed through a die in the first extruder, preferably the extrudate is transferred through a pressurized closed conduit to a second single or twin screw extruder. The closed conduit should be heated to maintain melt consistency. In the second extruder, the melt is cooled and exits as a foam at a die on the downstream end of the barrel.

The overall process is generally illustrated in FIG. 1. The process comprises four stages; solution blending, partially devolatilizing, finally devolatilizing, and pelletizing. Proceeding from left to right, low odor polyphenylene ether solution in toluene 20 and polystyrene solution in styrene monomer 22 are blended in solution blender 24 until homogeneous. The blended solution is then transferred through conduit 26 into devolatilization heat exchanger 28 and optional, but preferred, exchanger 32 which allow volatile impurities and solvent to be removed overhead at ports 30 and 34. The concentrated polymer solution is then passed through conduit 36 to devolatilizing extruder 38 in which high pressure water can be optionally injected through port 40 for final devolatilization. The polymer resin substantially free of volatile odoriferous impurities is then fed into pelletizer 46. Pellets 50 emerge from the pelletizer through conduit 48 and are stored for further usage or transport in container 52.

DESCRIPTION OF PREFERRED EMBODIMENTS

The following example illustrates the present invention. It is not to be construed to limit the claims in any manner whatsoever.

EXAMPLE (a) Preparation of polyphenylene ether and polystyrene resin feed solutions A solution of 2,6-xylenol monomer, containing 500 parts per million of 2,4,6-trimethylanisole based on monomer, dissolved in toluene is fed into a poly(2,6-dimethyl-1,4-phenylene ether) polymerization vessel. The monomer is allowed to polymerize in toluene solution in the presence of oxygen and a complex copper amine catalyst to form a polymer solution. The catalyst is removed in a liquid-liquid countercurrent extraction with catalyst complexing agent dissolved in water. The polymer solution, substantially free of catalyst, is then concentrated by heating and removing some of the toluene solvent by flash evaporation.

Styrene monomer, with ethyl benzene and toluene, is polymerized in a continuous polystyrene reactor. The product of the reactor contains 70-80 percent polystyrene and 30-20 percent styrene monomer and inert solvents.

(b) Blending and partial devolatilization of polyphenylene ether and polystyrene mixed solutions The solution products of the poly(2,6-dimethyl-1,4-phenylene ether) reactor and polystyrene reactor are mixed in an agitated mix tank to form the feed for the devolatilization steps.

An apparatus having a suitably sized circular heat exchanger as shown in FIG. 3 is utilized. A vacuum source with trap is connected to outlet 124 of the vessel to remove volatile components. A pump is utilized below outlet 123 to remove devolatilized polymer solution.

The process is performed by pumping into the heat exchanger through port 122 a polymer solution having about 50% volatiles comprising toluene and styrene and about 50% polymers. The polymers comprise 25 parts of polyphenylene ether and 75 parts of polystyrene made by blending the two solutions of step (a) in a blender until homogeneous. The polymer solution is fed at an initial temperature of about 130° to 150° C. and at a pressure of about 3.4 to about 20.4 atmospheres. The heat exchanger is maintained at a temperature in the range of about 200° to 240° C. by hot oil. The polyphenylene ether/polystyrene solution which exits the heat exchanger has a temperature of about 180° to 190° C. The pressure within the vessel is about 1345 Torr absolute. The volatile content of the solution is about 30 percent, determined by evaporation to constant weight.

The procedure is repeated in a second apparatus, as described in FIG. 3, using as feed the 30 percent volatile containing solution just obtained. The volatile content is reduced to less than 10 percent.

(c) Final devolatilization of polyphenylene ether/polystyrene blends

The partially devolatilized solution of less than about 1 percent volatile content from step (b) is sent to a steam stripper comprising an apparatus shown schematically in FIG. 4, typically a screw extruder. The extrudate is chopped into pellets. Volatile contents of approximately 10,000 ppm in the feed are reduced to about 600 ppm with steam and to about 1400 ppm without steam, and comprise mainly toluene and styrene. Without steam, the color of the pellets is a little bit darker.

(d) Extrusion foaming into low odor sheets

The pellets are then fed into a tandem extrusion foaming apparatus by procedures known to those skilled in this art. The die used in this example is a basic polystyrene die. The pellets of a 25/75 blend of PPE/polystyrene as made in step (c) with talc as a nucleant are added under the following key processing parameters:

| Blowing Agent | HCFC 22 (chlorodifluoromethane) at 6-7% |
|---|---|
| Primary Discharge Temp. | 266° C. |
| Primary Discharge Press. | 150 Bar |
| Secondary Melt Temp. | 134° C. |
| Secondary Discharge Press. | 65 Bar |
| Rate | 80 kg/hr |

A good structural foam is obtained with the following properties:

| Thickness | approx. 2 mm |
|---|---|
| Density | 5.5 lb/cu ft |

The foam has very low odor in human organoleptic tests, making it suitable for food packaging use. The heat distortion temperature of solid parts molded from such a composition is above about 230° F. at 66 psi, indicating microwavability.

It can be seen from the example, and as confirmed by numerous experiments, that the process of this invention drastically reduces the amount of odoriferous impurities present in the polyphenylene/polystyrene resin compositions and the resultant product is found to exhibit very low amine odor. This appears to be the result of the superior volatile removing power of the zone(s) of indirect heat exchange as evidenced by devolatilization overhead analysis showing the substantial removal of high concentrations of odoriferous amines.

Further analysis has indicated that steam stripping during final devolatilization also facilitates the removal of residual toluene and styrene monomer present in the resin. Where foaming is employed any remaining odor is found to substantially dissipate during the aging process of the blowing agent, where the remaining blowing agent equilibrates with the surrounding air, also helping beneficially to remove volatiles herein by reference.

Many variations of the present invention will suggest themselves to those skilled in the art in light of the above detailed description. For example instead of using poly(2,6-dimethyl-1,4-phenylene ether), use of poly(2,6-dimethyl-co-2,3,6-trimethyl-1,4-phenylene ether) or a combination thereof is also contemplated by the present invention. Likewise, rubber modified polystyrene may be used instead of crystal polystyrene. Any of a number of hydrocarbons or chlorofluorocarbons are suitable blowing agents for the present invention and can be used instead of dichlorodifluoromethane. Also contemplated is the use of a single foam extruder which can perform the melting, mixing and cooling of the foamable resin instead of tandem extruders. Toluene as the polymer solution solvent may be replaced by any normally liquid aromatic hydrocarbon, such as benzene, ethyl benzene or xylene. Other shaping processes to produce a wide variety of articles in which low odor is desirable are also contemplated by the present invention. All such obvious modifications are within the full intended scope of the appended claims.

What is claimed is:

1. A process for the production of a polyphenylene ether/polystyrene resin composition of low odor, the process comprising
   (i) blending
      (a) a solution comprising polyphenylene ether resin and a normally liquid aromatic hydrocarbon solvent, said solution having a by-product 2,4,6-trimethylanisole content of less than 1000 parts per million by weight based on said resin and sources of odoriferous amine content and
      (b) a solution comprising a polystyrene resin or a rubber modified polystyrene resin and a normally liquid aromatic hydrocarbon solvent;
   (ii) partially devolatilizing said blended solutions (a) and (b) by passing them through at least one zone of heat exchange whereby at least 25 percent of volatiles are evaporated and separated; and
   (iii) feeding the partially devolatilized blended resin composition to at least one stripping zone to complete the devolatilization thereof and to reduce the odoriferous amine content.

2. A process as defined in claim 1 wherein in step (i) (a) the source of odoriferous amine content is greater than about 10,000 parts per million based on said resin and in step (iii) the source of odoriferous amine content is reduced to less than about 2400 parts per million based on polyphenylene ether resin content.

3. A process as defined in claim 1 wherein said polyphenylene ether resin solution (a) comprises poly(2,6-dimethyl-1,4-phenylene ether), poly(2,6-dimethyl-co-2,3,6-trimethyl-1,4-phenylene ether) or a mixture thereof.

4. A process as defined in claim 1 wherein said polystyrene resin (b) comprises a polystyrene homopolymer or a rubber modified polystyrene.

5. A process as defined in claim 1 wherein said polyphenylene ether resin comprises from about 5 to about 95 parts by weight and said polystyrene resin comprises from about 95 to about 5 parts by weight based on 100 parts of combined resins by weight.

6. A process as defined in claim 1 wherein the heat exchange zone or zones in step (ii) are indirect and are set at temperatures ranging from about 150° C. to about 350° C.

7. A process as defined in claim 1 wherein in said solution (a) said normally liquid aromatic hydrocarbon solvent comprises toluene and in solution (b) said normally liquid aromatic hydrocarbon solvent comprises toluene, ethyl benzene, or styrene monomer.

8. A process as defined in claim 1 wherein said stripping zone comprises a steam stripper.

9. A process as defined in claim 8 wherein step (iii) is carried out with steam or water present.

10. A process as defined in claim 9 wherein said step (iii) is carried out with from about 1 to about 15 weight percent of said steam or water based on the weight of said blended resin composition.

11. A process as defined in claim 10 wherein about 2 weight percent of steam or water is employed.

12. A process as defined in claim 1 which further comprises the step of (iv) recovering the resin from step (iii) in particulate form.

13. A process as defined in claim 12 wherein step (iv) comprises feeding said blended resin from step (iii) into a pelletizing or dicing apparatus to produce pellet- or dice-shaped articles having very low odor in human organoleptic tests.

14. A process as defined in claim 12 including the further steps of combining said particulate resin with a polyphenylene ether resin, a polystyrene resin, a rubber modified polystyrene resin or a combination of any of the foregoing and subjecting the combination to at least one shaping operation.

15. A process as defined in claim 14 wherein said shaping operations comprise extruding through dies, molding or foam processing to produce shaped articles.

16. A process as defined in claim 12 including
   (A) feeding the particulate resin from step (iv) into at least one extruder and mixing it with a blowing agent; and
   (B) foaming the mixture through a die to form a shapable, foamed sheet having very low odor in human organoleptic tests.

17. A process as defined in claim 16 wherein step (A) comprises feeding the particulate blended resin from step (iv) into tandem extruders, the first extruder being adapted to melt and mix said resins and said blowing agent into the polymer melt and the second extruder is adapted to cool the melt prior to foaming.

18. A process as defined in claim 16 wherein said blowing agent is essentially insoluble in the blended resins at room temperature but soluble in the melt.

19. A process as defined in claim 18 wherein said blowing agent comprises a hydrocarbon, a chlorofluorocarbon, a hydrochlorofluorocarbon or a mixture thereof.

20. A process as defined in claim 19 wherein said hydrochloroflourocarbon blowing agent comprises chlorodifluoromethane.

21. A process as defined in claim 16 wherein a nucleating agent is added to the blended resin in step (iv) (A) in an amount sufficient to aid in regulating the size of the foam cell and number of foam cells.

22. A process as defined in claim 12, wherein the particulate resin is subjected to a shaping operation to form low odor solid sheets, or molded or extruded articles.

* * * * *